S. C. DAVIDSON.
TEA LEAF ROLLING MACHINE.
APPLICATION FILED DEC. 28, 1909.

980,213.

Patented Jan. 3, 1911.
8 SHEETS—SHEET 1.

INVENTOR:
Samuel Cleland Davidson
By Attorneys,

WITNESSES

S. C. DAVIDSON.
TEA LEAF ROLLING MACHINE.
APPLICATION FILED DEC. 28, 1909.

S. C. DAVIDSON.
TEA LEAF ROLLING MACHINE.
APPLICATION FILED DEC. 28, 1909.

980,213.

Patented Jan. 3, 1911.
8 SHEETS—SHEET 3.

WITNESSES:

INVENTOR:
Samuel Cleland Davidson,
By Attorneys,

S. C. DAVIDSON.
TEA LEAF ROLLING MACHINE.
APPLICATION FILED DEC. 28, 1909.

980,213.

Patented Jan. 3, 1911.
8 SHEETS—SHEET 4.

WITNESSES:

INVENTOR:
Samuel Cleland Davidson,
By Attorneys,

S. C. DAVIDSON.
TEA LEAF ROLLING MACHINE.
APPLICATION FILED DEC. 28, 1909.

980,213.

Patented Jan. 3, 1911.
8 SHEETS—SHEET 5.

WITNESSES
Fred White
René Bruine

INVENTOR:
Samuel Cleland Davidson,
By Attorneys,
Arthur C. Fraser & Usina

S. C. DAVIDSON.
TEA LEAF ROLLING MACHINE.
APPLICATION FILED DEC. 28, 1909.

980,213.

Patented Jan. 3, 1911.
8 SHEETS—SHEET 6.

Fig. 13.

S. C. DAVIDSON.
TEA LEAF ROLLING MACHINE.
APPLICATION FILED DEC. 28, 1909.

980,213.

Patented Jan. 3, 1911.

WITNESSES:

INVENTOR:
Samuel Cleland Davidson,
By Attorneys,

UNITED STATES PATENT OFFICE.

SAMUEL CLELAND DAVIDSON, OF BELFAST, IRELAND.

TEA-LEAF-ROLLING MACHINE.

980,213. Specification of Letters Patent. Patented Jan. 3, 1911.

Application filed December 28, 1909. Serial No. 535,365.

*To all whom it may concern:*

Be it known that I, SAMUEL CLELAND DAVIDSON, of Sirocco Engineering Works, Belfast, Ireland, merchant, have invented certain new and useful Improvements in or Relating to Tea-Leaf-Rolling Machines, of which the following is a specification.

This invention relates to tea leaf rolling machinery.

In my prior British Patents Nos. 20805 of 1895, 8834 of 1896, and 22149 of 1896, tea leaf rolling machines are described in which the table which forms the base of the receptacle for the leaf receives a combined reciprocating and rotary motion from eccentrically placed crank-like members on which it is mounted, the said table was also provided with suitable cup depressions, and conical projections and the receptacle with side plows for effectively imparting the rolling action of the table to the leaf.

It is the object of the present invention to provide an improved machine of more simple construction which will produce the same or a similar rolling effect on the tea leaf.

According to this invention the tea leaf to be rolled is contained in a receptacle (hereinafter referred to as the container) in the base of which is disposed and adapted for rotation about a vertical or approximately vertical axis of the container, an inclined blade or blades or a helical screw form of blade or blades or a rotating floor provided with one or more inclined sloping or helical surfaces inclined to the plane of the floor, said blade or blades or inclined surfaces being adapted to exert, during rotation, a lifting and falling motion combined with the requisite squeezing and rolling action on the leaf.

Where a rotary blade is employed it may revolve over a stationary floor or the floor may be rotated in an opposite direction to the blades or in the same direction as the blades at a different speed. The container may be so shaped or the inner surfaces thereof suitably roughened, corrugated or provided with projections or recesses in order to retard or partially check the tendency of the leaf within the said receptacle to rotate as a mass and to move too freely upward with a slipping action at the circumference of the mass when acted upon by the rotating inclined blade in the base of the receptacle. I may employ a container having its interior surface so shaped or having the obstructing devices upon or in said surface so graduated as to distribute the said retarding effect in a substantially uniform manner from the top to the bottom of the mass of leaf in the container. I may further if required group two or more of the machines or containers together as hereinafter described. The said inclined surface or surfaces when adapted to rotate over a stationary floor, may resemble a ship propeller with one or more blades mounted on a central rotating pillar or shaft which imparts to it the requisite rotary motion around the base of the container and with its lower edge as close as possible without touching the floor thereof. When said inclined surface forms an integral part of the floor and rotates therewith it may extend from the circumference to or near the center of the container or to one side or other of the center, and in a modification it may be merged into a pillar or a conical, or part conical, or mound like formation disposed at or adjacent to the center.

The upper and trailing end of the inclined surface or surfaces may terminate abruptly, or be formed, with a suitable rear slope or incline which may, if required, resemble or be identical with the forward incline and thereby constitute a doubly and oppositely inclined floor, and said upper trailing edge of the inclined surface may be tapered off in a spiral helix toward the center.

When the floor is stationary it may be flat or formed with a conical or dished surface, and the trailing or top edge of the rotating propeller blade (or blades) may be horizontal from hub to periphery or may be higher at hub than periphery or vice versa, or be of any suitable curvature.

The accompanying drawings illustrate some forms of the invention:—

Fig. 11$^a$ is a detail section showing a further modification; Figs. 12 and 13 are similar views of further modifications; Fig. 12$^a$ is a detail of Fig. 12.

Referring first to Figs. 1 to 4, $a$ is the container constructed preferably of sheet brass in the form of a cylindrical receptacle which fits into the upright circular flange of the stationary floor $a'$ over which rotates a single propeller like blade $b$ mounted on a central hub $c$ driven by the vertical shaft $b'$ and gearing $b^2$ from the driving shaft $b^3$ and pulleys $b^4$. This rotary member $b$ forms a helical or inclined surface rising upward and rearward to the direction of rotation. The upper trailing edge $c'$ may if desired, be suitably rounded over, although in the form shown, it terminates abruptly, and that part $c^2$ of the trailing edge $c'$ which is adjacent to the center merges into the hub or boss $c$ within which the shaft $b'$ is secured.

Figure 1:
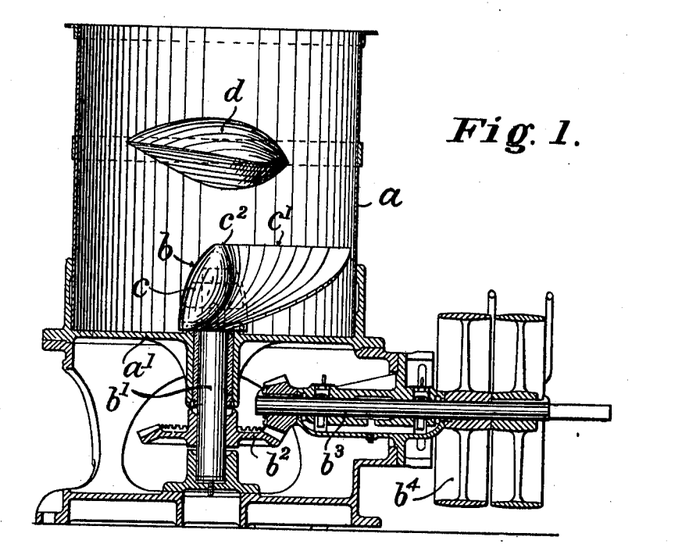
Figure 1 is a vertical section of a complete machine in which the floor is stationary, and the rotary inclined surface formed as a single bladed screw of the ship propeller type.
Figure 2:
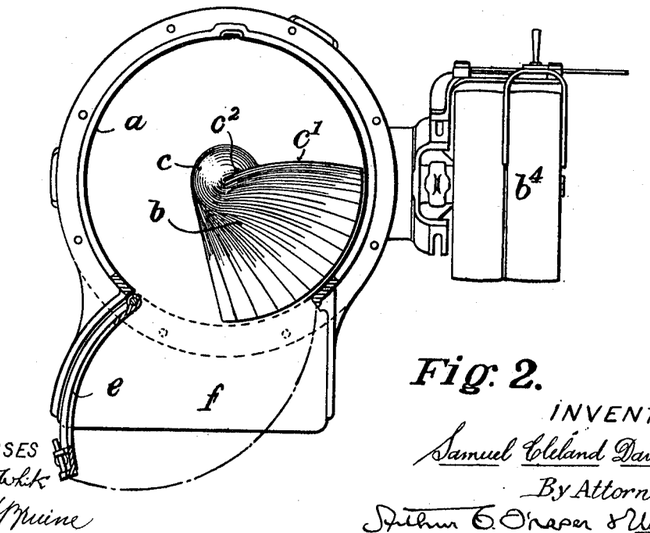
Fig. 2 is a plan of Fig. 1.
Figure 3:
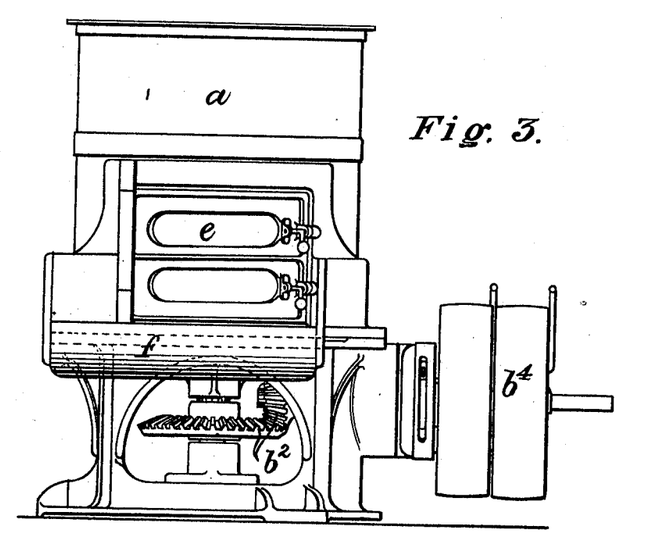
Fig. 3 is an external elevation which is applicable to Figs. 1 and 2 and also to Figs. 5 and 6.
Figure 4:
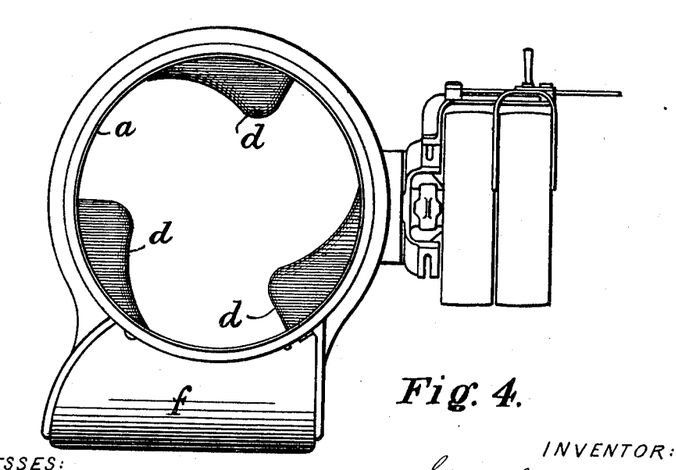
Fig. 4 is a plan of Fig. 3 showing the projecting side plows which coact with the inclined surface.

At a suitable height above the upper or trailing edge $c'$ and fixed to the stationary side of the container $a$ are fitted retarding devices which in this construction consist of side plows $d$ Figs. 1 and 4 inclined downward in the direction of rotation of the inclined surface. The tapering to the projecting edge of the side plows prevents the leaf being held by them more than sufficiently to partially arrest the tendency to slipping and rotary movement along the inner surface of the container while at the same time slightly deflecting the leaf toward the center of the container where an upward movement or circulating current of the leaf is continuously rising to the top, and falling over to the side where it mingles with the falling mass as the inclined surface of the screw blade $b$ passes each of the side plows $d$.

The leaf container $a$ is provided with a door $e$ at the side preferably so arranged that the material may, when required, be discharged therethrough into a chute $f$ by the rotary motion of the apparatus and without requiring its stoppage. The bottom edge of this door is not intended to fit closely over the surface of the floor $a'$, which slackness of fit permits of the watery juices expressed from the leaf (sometimes in considerable quantity) during the rolling operation to escape out of the container, on to the discharge chute $f$ at the end of which the fluid can be collected in any suitable receptacle.

Figure 5:
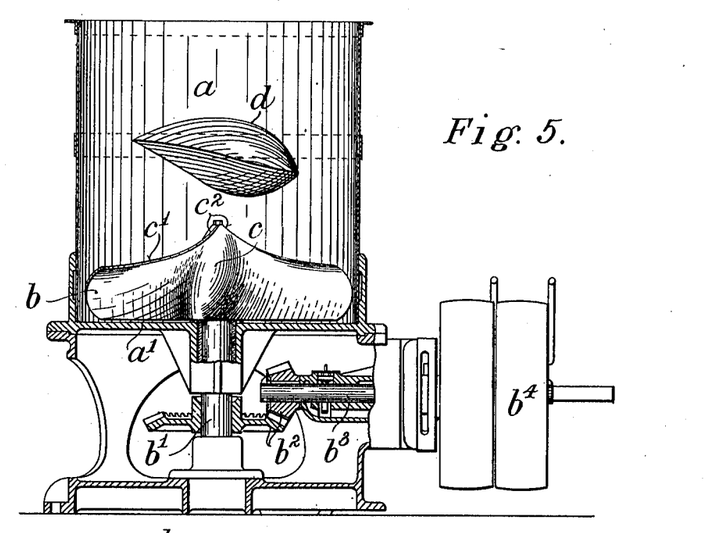
Figs. 5 and 6 are similar views to Figs. 1 and 2 showing the inclined surface in the form of a double bladed screw of the propeller type.
Figure 6:
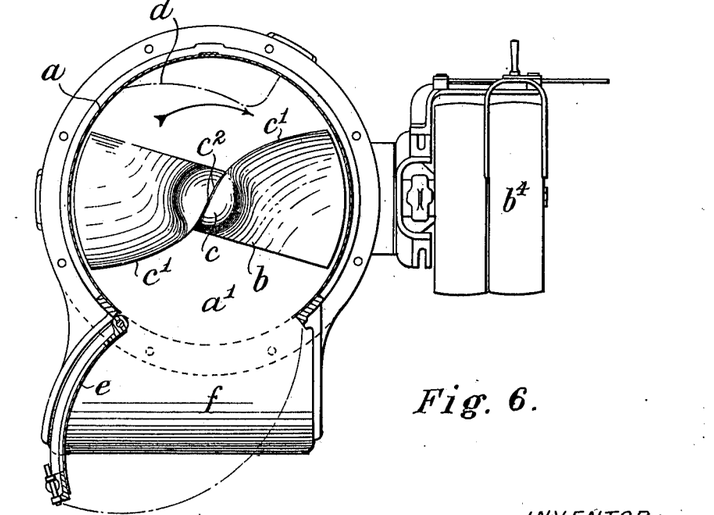

In the form shown in Figs. 5 and 6 the rotary member or screw blade $b$ is in the form of a double helical blade or double armed propeller blade driven as before. In this form two inclined surfaces are provided and the parts $c^2$ $c^2$ of the trailing edge $c'$ $c'$ which are adjacent to the center are shown as higher than the outer ends of $c$. $d$ is the retarding device or side plow. Only one is shown as being employed in this construction but two or more may be used if desired. This construction is otherwise similar to that shown in Figs. 1—4.

Figures 7, 9:
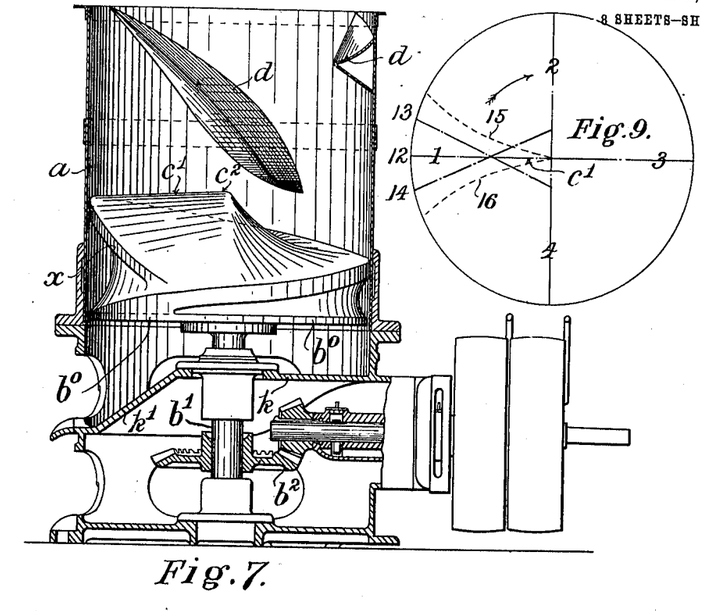
Figs. 7 and 8 are similar views of a further modified construction wherein the floor of the container has the inclined surface mounted upon or integral with it so that both rotate together.
Figs. 9 and 10 are diagrammatic views in plan and elevation showing some modifications in the form of the inclined surface.
Figures 8, 10:
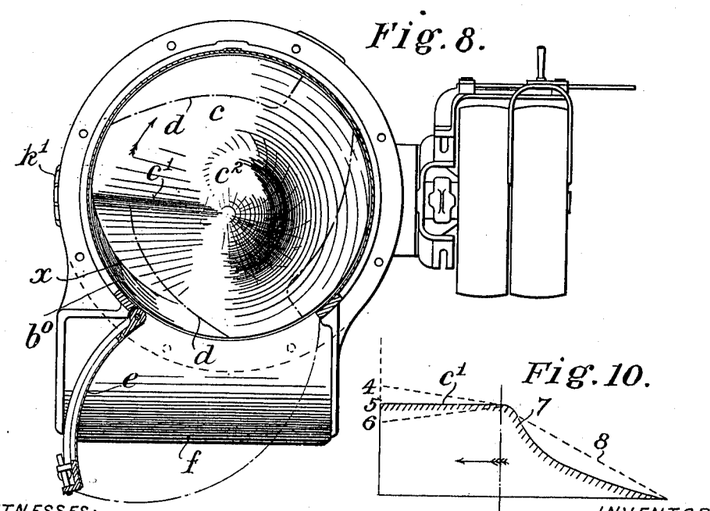

Referring now to the modification shown in Figs. 7 and 8, $b^0$ is a rotary table forming the floor and driven by the central vertical table $b'$ and gearing $b^2$ $b^2$ as before. Upon the rotary side $b^0$ of the receptacle is formed a helical inclined surface $c$ rising upward to a suitable height, and in this illustration it is shown as covering in plan the whole or the greater portion of the circular table but it can, when desired, be made much shorter as hereinafter explained by the diagrams shown in Figs. 9 and 10. The upper trailing edge $c'$ of the said inclined surface $c$ is shown as rounded over but it may terminate abruptly if required and that part $c^2$ of the trailing edge which is adjacent to the center merges into a cone. When the center of the floor or rotating table is as shown of conical formation the highest point or shoulder of this conical mound may be disposed eccentrically in order to counteract and prevent any tendency the material may have to pile up or pack closely in a more or less stationary central core. $d$ $d$ are the retarding devices or side plows. With the double inclines or helical surfaces such as shown a space or aperture such as indicated at $x$ is provided to allow any of the leaf which gets beneath the inclines to return to the container by the rotation of the table, instead of collecting and clogging around the circumference of the rotating table. In order that the juice or moisture from the leaf under treatment may be drained away, the table $b^0$ is so fitted that the juice may escape between its edge and the sides of the casing $a$, and be collected upon a suitable shield such as $k$ which shields the gearing as shown or in some other suitable way, means being provided such as a stoop $k'$ for drawing off the liquid and removing the same as required. It is to be understood that the side plows $d$ may be varied in shape as required and I may substitute therefor other suitable forms of retarding devices; for example I may substitute therefor suitable battens or knobs or projections or equivalent recesses suitably disposed in or on the inner surface of the container or I may employ the form of retarding devices hereinafter described with reference to Figs. 11 to 13.

Figs. 9 and 10 show in diagram some possible variations in the form of the inclined surface c, but are not to be taken as a limitation of the variations. As indicated in Fig. 9 the inclined surface in plan may extend from 1 to 2 or 3 or 4 or around to 1 again or any intermediate distance or if required more than one inclined surface may be disposed around the axis, as an example, one incline may commence at 3 and rise to 1 and another commence at 1 and rise to 3, and the terminal edge or ridge $c'$ may be radial as at 12 or oblique as at 13 and 14 or curved as at 15 and 16. In elevation (see Fig. 10) the upper termination $c'$ may be horizontal or inclined as at 4, 5 and 6 and the central termination may be in the form of a mound and the slope be more or less gradual or curved as at 7 or 8.

Referring now to the modified means for retarding or partially checking the beforementioned rotary tendency of the leaf to rotate as a mass when acted upon by the inclined blade or equivalent device rotating in the base of the container and for distributing the said retarding effect in a substantially uniform manner from the top to the bottom of the mass of leaf in the container:—the said uniformly distributed retarding effect may be obtained by making the interior of the container converge toward the top in conical or other suitable form and such converging surfaces may be corrugated vertically or sloped circumferentially in screw formation or as horizontal rings or the container may have an upwardly converging stepped formation either as horizontal bands or as a helix. The steps or corrugations may be so formed in section that each step or corrugation rises more or less vertically and then curves inwardly toward the upper edge and where the steps are of considerable vertical depth the substantially flat portions thereof may be either vertical or suitably inclined. The said uniformly distributed retarding effect may also be obtained by bars, blades, battens or recesses of different lengths disposed vertically or at a suitable slope on the surface of the container, some of the battens or recesses extending down close to the path of the rotating inclined blade while others only extend part way and some farther than others. In modified arrangements the battens may be reduced in thickness or tapered away toward the lower ends, in which case the battens may be all of the same length or of variable lengths. A similar effect may be produced by suitable knobs, projections or recesses disposed in rows similar to the battens. An example is shown in Fig. 13 where $x$ $x$ are knobs formed as rounded bolt heads.

Figure 11:
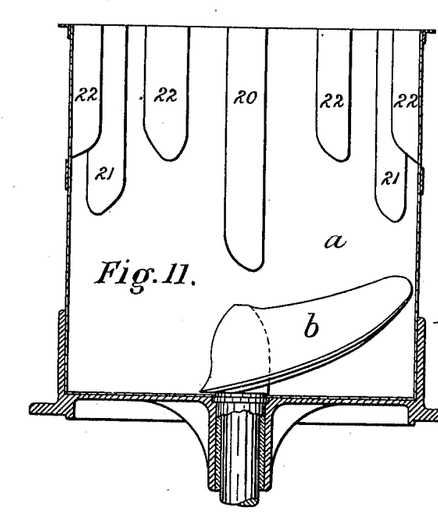
Fig. 11 is a sectional elevation of a container showing a modified form of retarding devices.
Figures 12, 12A:
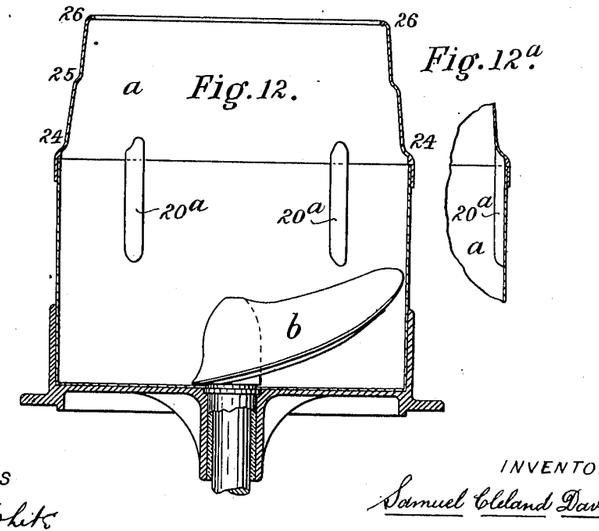
Figure 13:
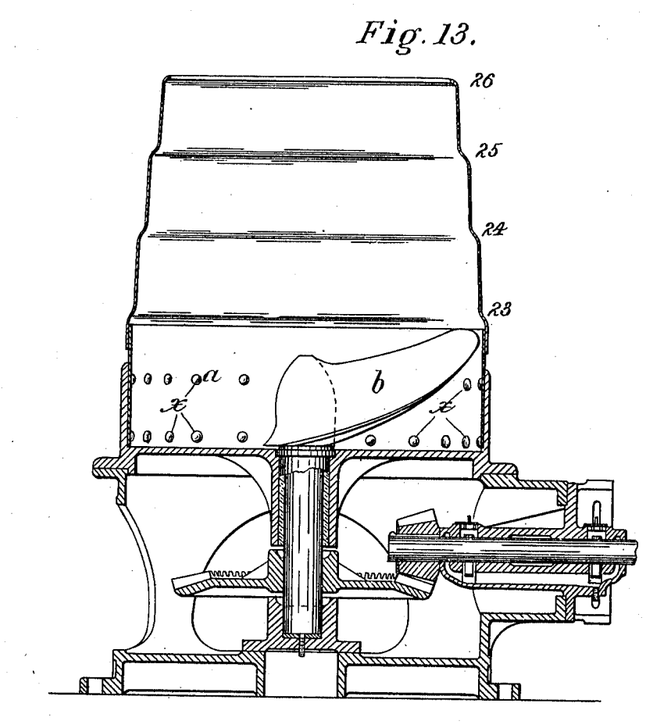

Figs. 11 to 13 of the accompanying drawings show some forms of the constructions for obtaining the uniformly distributed retarding effect referred to. In these figures the container is shown as provided with an inclined blade of the kind shown in Fig. 1.

Figure 11A:
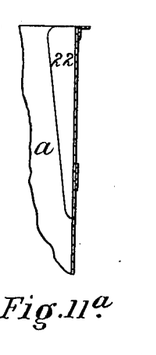

In Fig. 11 $a$ is the interior of the container, $b$ is the operating blade, three or any suitable number of vertical battens are indicated at 20 and extend from the top of the container to where the highest part of the blade $b$ sweeps around the inner surface of the container. 21, 21 are similar battens extending down a shorter way from the top than the battens 20 and intermediate between the battens 20 and 21 are disposed still shorter battens 22, the two battens 20 at the extreme right and left of Fig. 11 show how they project inward into the container. Fig. 11$^a$ shows in section a modified form of batten with its inward projections at the top greater than at the bottom.

Fig. 12 shows a modification where the sides of the leaf container converge upwardly and inwardly in superposed steps as at 24, 25, 26 and the battens 20$^a$ only extend from the path of the blade $b$ up to the step 24 where they die into or form a continuation of the surface between 24 and 25 as will be more clearly seen in Fig. 12$^a$ which is a section through one of the battens, and the adjacent side of the container.

Fig. 13 shows another modification where the battens are dispensed with and the container is made of inwardly stepped conical formation as indicated at 23, 24, 25, 26, upward from where the top of the blade $b$ passes around. The surfaces between the steps 23, 24, 25 and 26 are shown as slightly inclined inward, they may however be vertical if required. It will be understood that the step formation illustrated may be modified into a corrugated conical container of suitable form.

I do not bind myself to the exact number of vertical battens nor their length and projection as hereindescribed and illustrated as such may be varied to suit requirements, nor do I bind myself to the number of steps in the conical container as shown in Figs. 12 and 13 as these may also be varied.

As a further modification I may combine together two or more tea leaf rolling machines such as herein described and illustrated in such manner that they may be operated by one driving shaft, whereby a saving in floor space is effected as compared with the floor space requisite for the same number of machines driven separately and individually. The said machines may be combined as separately operating machines, or two or more of the rotary inclined blades or devices hereinbefore described may be arranged to operate within one container of appropriate shape.

Figure 14:
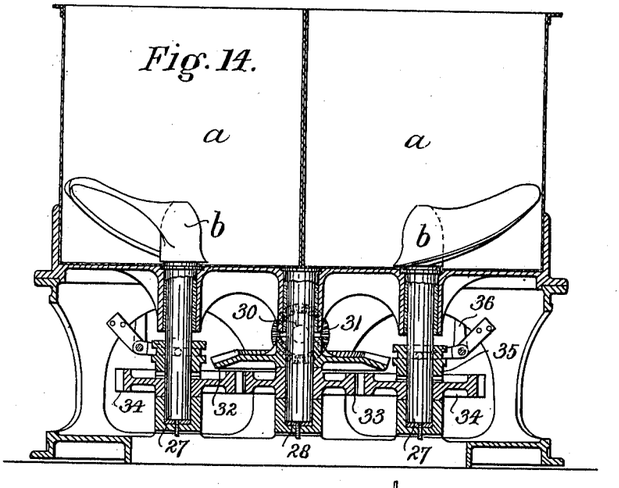
Figs. 14 and 15 are respectively a sectional elevation and a plan showing two machines grouped together as hereinafter described.
Figure 15:
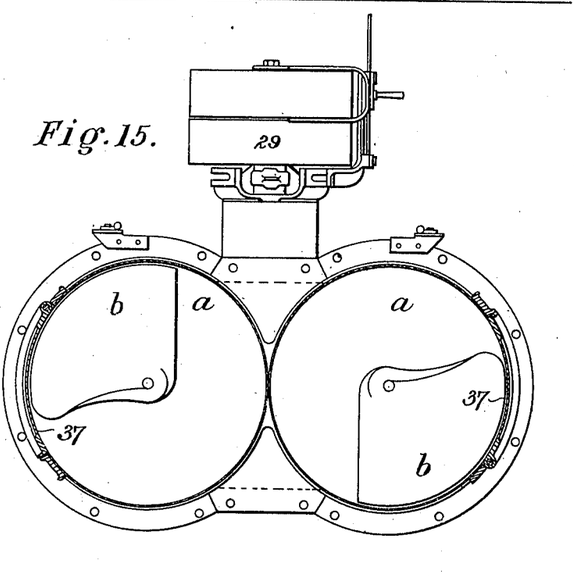

Referring first to Figs. 14 and 15 *a a* are the two leaf containers and *b b* are respectively the screw-like blades rotating in the base thereof. 27, 27 are the vertical shafts upon which the said blades are mounted. 28 is a centrally disposed vertical driving shaft operated from the driving pulley 29 through the horizontal shaft 30, bevel pinion 31 and bevel wheel 32. 33 is a spur wheel on the driving shaft which gears into the spur wheels 34, 34 one on each of the vertical shafts 27. Clutches 35, 35 are provided whereby either of the blades *b* may be thrown out of operation while the driving shaft 28 and spur wheels 33 and 34 are running. When out of gear the spur wheel 34 runs loose on the shaft 27. Levers 36 are provided for operating the clutches 35. By this gear the two machines may be either operated together or separately. 37 indicates the discharge doors from the container in Figs. 15, 16 and 17.

I do not limit myself to the exact form and arrangement of the gearing and driving mechanism illustrated as it is obvious that other equivalent mechanism may be used to suit varying circumstances.

Figure 16:
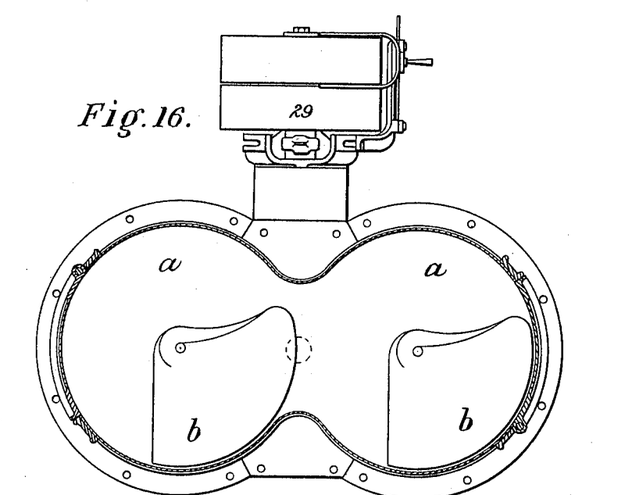
Figs. 16 and 17 are plan views of modified forms of grouped machines.

Fig. 16 is a plan of a modified arrangement of Figs. 14 and 15 wherein the two leaf containers *a a* instead of being individually separate merge into one another so as to form one combined leaf container.

Figure 17:
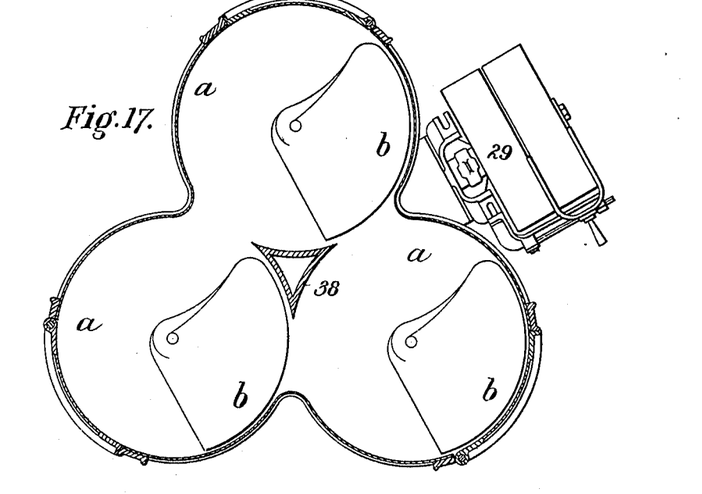

Fig. 17 is a plan of another modification showing three rotary blades operating in one leaf container of trefoil shape.

In the form shown in Figs. 16 and 17 the clutch mechanism may be arranged as before in order to start off first one rotary blade and then the other; single claw clutches being used to insure that the propellers rotate in proper order but if required all the rotary blades in the one container may be started at one time and for this purpose a suitable clutch may be provided between the central shaft and the driving mechanism. In other respects the gearing employed for the machine shown in Figs. 16 and 17 may be the same as that shown in Figs. 14 and 15 and similar letters of reference are used for similar parts in all the figures.

In the double or trefoil shaped containers shown in Figs. 16 and 17 the rotary blades *b* may be arranged to follow one another past the point where their paths approach nearest to one another, and in the trefoil shape of container shown in Fig. 17 a central pillar of triangular, circular or other form may be provided where the paths of the three rotary inclined blades would otherwise leave a central dead space as indicated at 38 where a triangular pillar or frame is shown.

In applying the beforementioned retarding devices to the double and trefoil form of container herein set forth, the battens or equivalent devices will be arranged in appropriate manner as will be well understood without further description and the conical and stepped form of container may also be here employed by forming the container as two or three conical or stepped containers merged together in the same manner as for the circular containers herein illustrated.

What I claim and desire to secure by Letters Patent is:—

1. A tea leaf rolling machine consisting of the combination of a tea leaf container, a device adapted for rotation about a vertical axis in the base of the container and having a surface inclined downwardly in the direction of rotation, whereby said device exerts during rotation, a lifting, falling, squeezing and rolling action on the leaf.

2. A tea leaf rolling machine consisting of the combination of a tea leaf container, a blade disposed in the base of the container and having a surface inclined downwardly in the direction of rotation, means whereby said blade is rotated about the central vertical axis of the container for the purpose of imparting during rotation a lifting, falling, squeezing and rolling action on the leaf.

3. A tea leaf rolling machine consisting of the combination of a tea leaf container, a helical screw form of blade disposed in the base of the container, means whereby said blade is rotated about the central vertical axis of the container for the purpose of imparting during rotation a lifting, falling, squeezing and rolling action on the leaf.

4. A tea leaf rolling machine consisting of the combination of a tea leaf container, a helical screw form of blade disposed in the base of the container and adapted for rotation about the vertical axis of said container.

5. A tea leaf rolling machine consisting of the combination of a tea leaf container having its upper part of truncated conical form converging toward its upper end, a helical screw form of blade disposed in the base of the container and adapted for rotation about the vertical axis of the container.

6. A tea leaf rolling machine consisting of the combination of a tea leaf container of stepped formation converging toward the upper end, a helical screw from of blade disposed in the base of the container and adapted for rotation about the vertical axis of the container.

7. A tea leaf rolling machine consisting of the combination of a tea leaf container of corrugated conical formation, a helical screw form of blade disposed in the base of the container and adapted for rotation about the vertical axis of the container.

8. A tea leaf rolling machine consisting of the combination of a tea leaf container of stepped conical formation converging toward its upper end, vertical battens disposed on the walls of said container and merging into the stepped portions thereof, a rotary device disposed in the base of the container adapted for rotation about the vertical axis of the container and having a surface inclined downwardly in the direction of rotation.

9. A tea leaf rolling machine consisting of the combination of a tea leaf container, a rotary device disposed in the base of the container and adapted for rotation about the vertical axis thereof, and having a surface inclined downwardly in the direction of rotation, and means for retarding or partially checking the rotation of the mass of tea leaf in the container when acted upon by the rotary device in the base thereof.

10. A tea leaf rolling machine consisting of the combination of a tea leaf container, a helical screw form of blade disposed in the base of the container and adapted for rotation about the vertical axis of said container, and means for retarding or partially checking the rotary tendency of the mass of leaf in the container when acted upon by the rotary blade.

11. A tea leaf rolling machine consisting of the combination of a tea leaf container, a rotary device disposed in the base of the container and adapted for rotation about the vertical axis thereof, and having a surface inclined downwardly in the direction of rotation, and obstructing devices upon the inner walls of the container for the purpose of retarding or partially checking the rotary tendency of the mass of leaf therein when acted upon by the said rotary device.

12. A tea leaf rolling machine consisting of the combination of a tea leaf container, a rotary device disposed in the base of the container and adapted for rotation about the vertical axis thereof, and having a surface inclined downwardly in the direction of rotation, and projections upon the inner walls of the container for the purpose of retarding or partially checking the rotary tendency of the mass of leaf therein when acted upon by the said rotary device.

13. A tea leaf rolling machine consisting of the combination of a tea leaf container, a rotary device disposed in the base of the container and adapted for rotation about the vertical axis thereof, and having a surface inclined downwardly in the direction of rotation, and battens upon the inner walls of the container for the purpose of retarding or partially checking the rotary tendency of the mass of leaf therein when acted upon by the said rotary device.

14. A tea leaf rolling machine consisting of the combination of a tea leaf container, a rotary device disposed in the base of the container and adapted for rotation about the vertical axis thereof, and having a surface inclined downwardly in the direction of rotation, and obstructing devices upon the inner walls of the container for the purpose of retarding or partially checking the rotary tendency of the mass of leaf therein when acted upon by the said rotary device, said obstructing devices being so graduated as to distribute said retarding effect in a substantially uniform manner from the top to the bottom of the mass of leaf in the container.

15. A tea leaf rolling machine consisting of the combination of a tea leaf container, a rotary device disposed in the base of the container and adapted for rotation about the vertical axis thereof, and having a surface inclined downwardly in the direction of rotation, and obstructing devices upon the inner walls of the container for the purpose of retarding or partially checking the rotary tendency of the mass of leaf therein when acted upon by the said rotary device, said obstructing devices being so graduated as to fade away toward the base of the container.

16. A tea leaf rolling machine consisting of the combination of a tea leaf container having its interior surface provided with battens of different lengths, a rotary device disposed in the base of the container, adapted for rotation about the vertical axis of the container and having a surface inclined downwardly in the direction of rotation, for the purpose of imparting during rotation a lifting, filling, squeezing, and rolling action on the leaf.

17. A tea leaf rolling machine consisting of the combination of a tea leaf container, a rotary device disposed in the base of the container and adapted for rotation about the vertical axis thereof, and having a surface inclined downwardly in the direction of rotation, and battens of different lengths disposed on the inner surface of the container, said battens being so arranged that some extend downward farther toward the path of the rotary device than the others whereby the rotary tendency of the mass of leaf is retarded or partially checked in a substantially uniform manner from the top to the bottom of the mass of leaf in the container.

18. A tea leaf rolling machine consisting of the combination of two tea leaf containers closely adjacent to one another, two rotary devices disposed one in the base of each container, and having a surface inclined downwardly in the direction of rotation, and means for driving both said rotary devices from a common shaft.

19. A tea leaf rolling machine consisting of the combination of two tea leaf containers closely adjacent to one another, two rotary devices disposed one in the base of each container, and having a surface inclined downwardly in the direction of rotation, means for driving both said rotary devices from a common shaft, and means for coupling and uncoupling each rotary device with the common driving shaft.

20. A tea leaf rolling machine consisting of the combination of a plurality of rotary devices mounted to rotate about vertical axes, and having a surface inclined downwardly in the direction of rotation, a common container of a shape appropriate to inclose the circular paths of the group of rotary devices, means for driving said rotary devices from a common shaft and means for coupling and uncoupling each of said rotary devices to the common driving shaft.

21. A tea leaf rolling machine consisting of the combination of a plurality of rotary devices mounted to rotate about vertical axes, and having a surface inclined downwardly in the direction of rotation, a common container of a shape appropriate to inclose the circular paths of the group of rotary devices, means for driving said rotary devices from a common shaft and means for coupling and uncoupling each of said rotary devices to the common driving shaft, and means for filling up the dead space left in the middle of the container between the circular paths of the said rotary devices.

In witness whereof, I have hereunto signed my name in the presence of two subscribing witnesses.

SAMUEL CLELAND DAVIDSON.

Witnesses:
    GEORGE GOOLD WARD,
    HUGH TAYLOR COULTER.